United States Patent [19]

Shimoda

[11] Patent Number: 5,631,742
[45] Date of Patent: May 20, 1997

[54] APPARATUS FOR DECODING EDITED CODED DATA

[75] Inventor: Kenji Shimoda, Kanagawa-ken, Japan

[73] Assignee: Kabushiki Kaisha Toshiba, Kanagawa, Japan

[21] Appl. No.: 128,029

[22] Filed: Sep. 29, 1993

[30] Foreign Application Priority Data

Sep. 30, 1992 [JP] Japan .................................. 4-262518
Feb. 12, 1993 [JP] Japan .................................. 5-024563

[51] Int. Cl.$^6$ .............................. H04N 5/76; H04N 5/93; G11B 27/02
[52] U.S. Cl. ............................. 386/52; 386/109; 386/112
[58] Field of Search ................................ 358/335, 311, 358/327; 360/14.1, 14.2, 14.3, 32, 27, 53; 369/47, 48; H04N 5/76, 5/78, 5/92, 9/79, 5/93

[56] References Cited

U.S. PATENT DOCUMENTS

| | | | |
|---|---|---|---|
| 3,573,728 | 4/1971 | Kolankowsky | 371/40.1 |
| 5,040,067 | 8/1991 | Yamazaki . | |
| 5,253,257 | 10/1993 | Murakami | 360/53 |
| 5,262,877 | 11/1993 | Otsuka | 358/335 |
| 5,386,323 | 1/1995 | Ishiwata et al. | 360/27 |
| 5,392,129 | 2/1995 | Ohtaka et al. | 360/53 |

FOREIGN PATENT DOCUMENTS

| | | |
|---|---|---|
| 0124043 | 11/1984 | European Pat. Off. . |
| 0456433 | 11/1991 | European Pat. Off. . |
| 3106190 | 5/1991 | Japan . |
| 414974 | 1/1992 | Japan . |

*Primary Examiner*—Thai G. Tran
*Attorney, Agent, or Firm*—Cushman, Darby & Cushman IP Group of Pillsbury Madison & Sutro LLP

[57] ABSTRACT

An apparatus for decoding edited coded data for video signals where the decoding apparatus is capable of preventing a disturbance of a video image at the editing point. During editing of video signals, an edit header is added before and after the editing point, indicating a valid data portion and an invalid data portion on the video signal. A data start/end detector detects when an invalid data portion occurs on a coded video signal. The decoder decodes the video signal according to the edit header, but inhibits decoding of the invalid data portion such that decoding begins again at the next valid data portion. By inhibiting the decoding of unnecessary data corresponding to the invalid data portions, disturbance of the video image is prevented at the editing point.

2 Claims, 15 Drawing Sheets

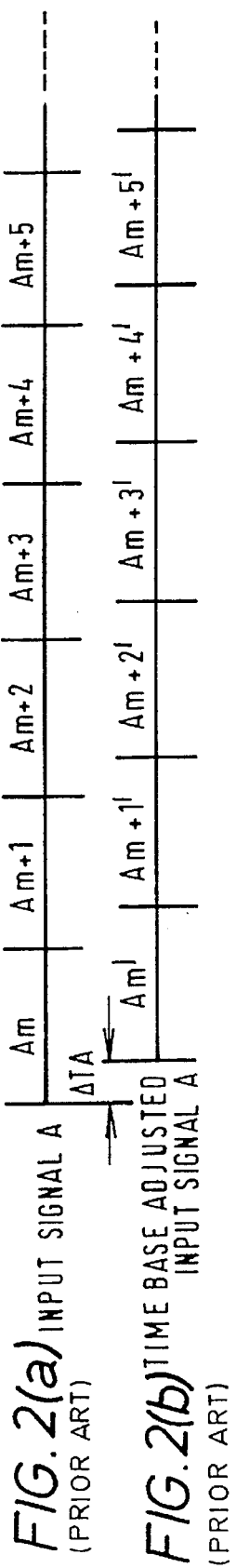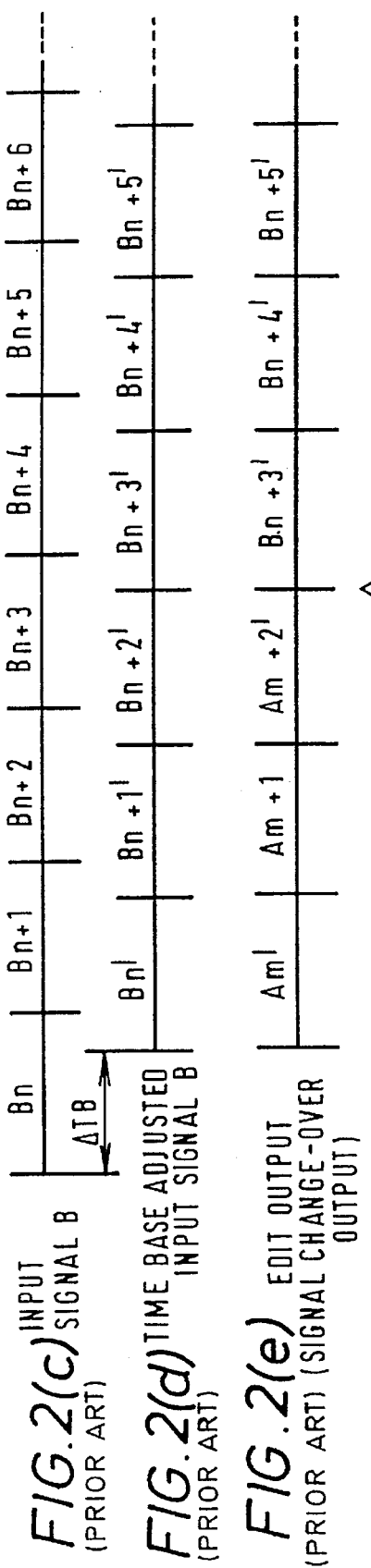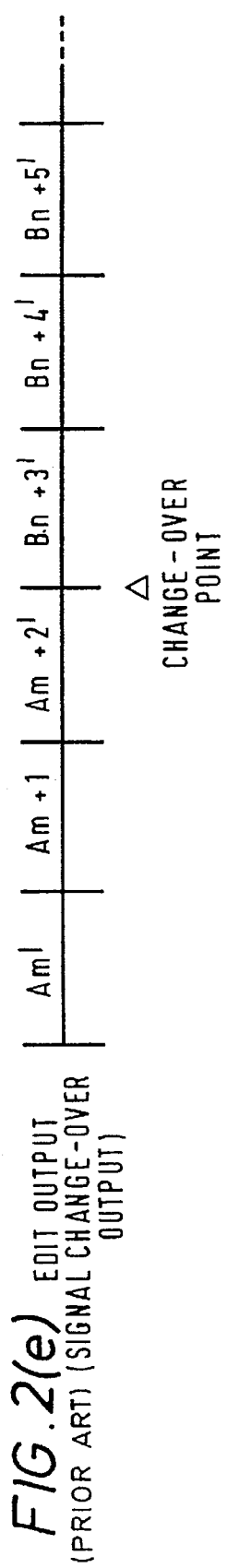
FIG. 2(a) INPUT SIGNAL A (PRIOR ART)
FIG. 2(b) TIME BASE ADJUSTED INPUT SIGNAL A (PRIOR ART)
FIG. 2(c) INPUT SIGNAL B (PRIOR ART)
FIG. 2(d) TIME BASE ADJUSTED INPUT SIGNAL B (PRIOR ART)
FIG. 2(e) EDIT OUTPUT (SIGNAL CHANGE-OVER OUTPUT) (PRIOR ART)

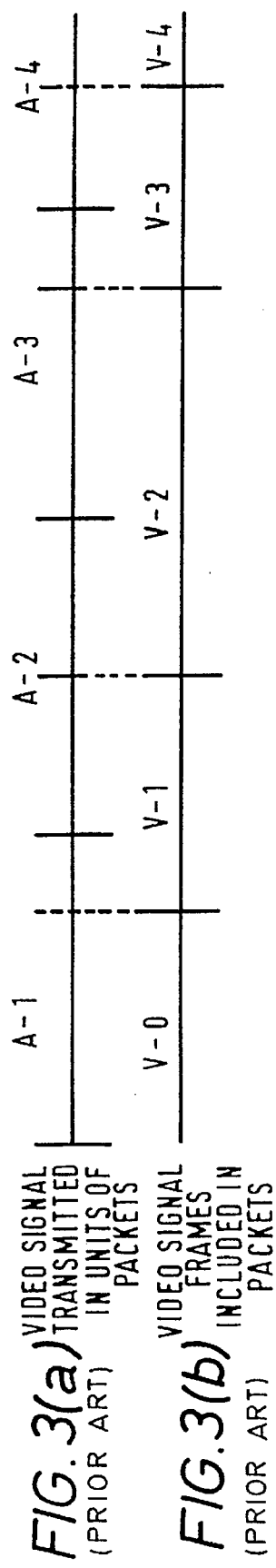
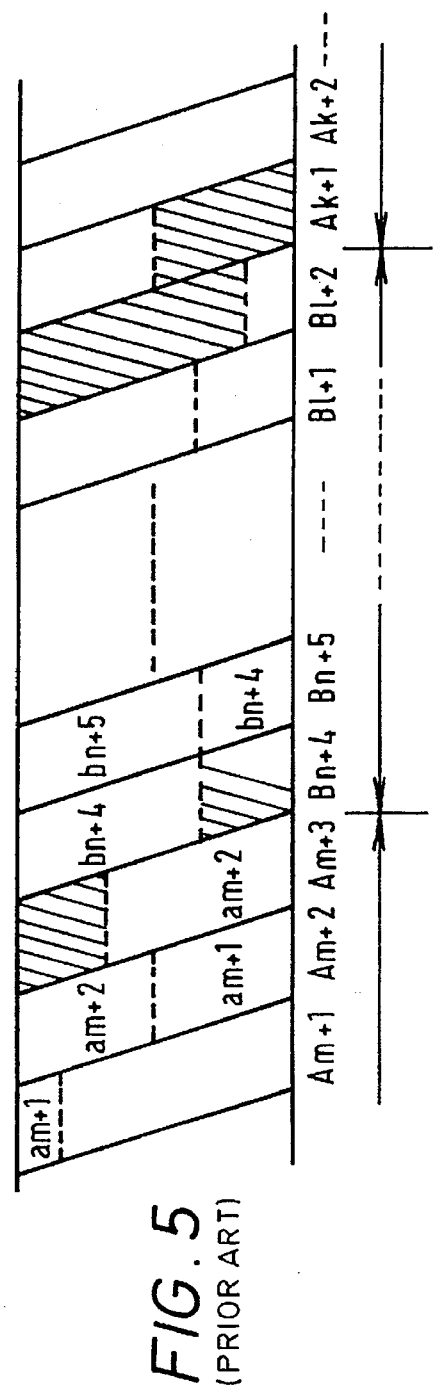
FIG. 3(a) (PRIOR ART) VIDEO SIGNAL TRANSMITTED IN UNITS OF PACKETS
FIG. 3(b) (PRIOR ART) VIDEO SIGNAL FRAMES INCLUDED IN PACKETS
FIG. 5 (PRIOR ART)

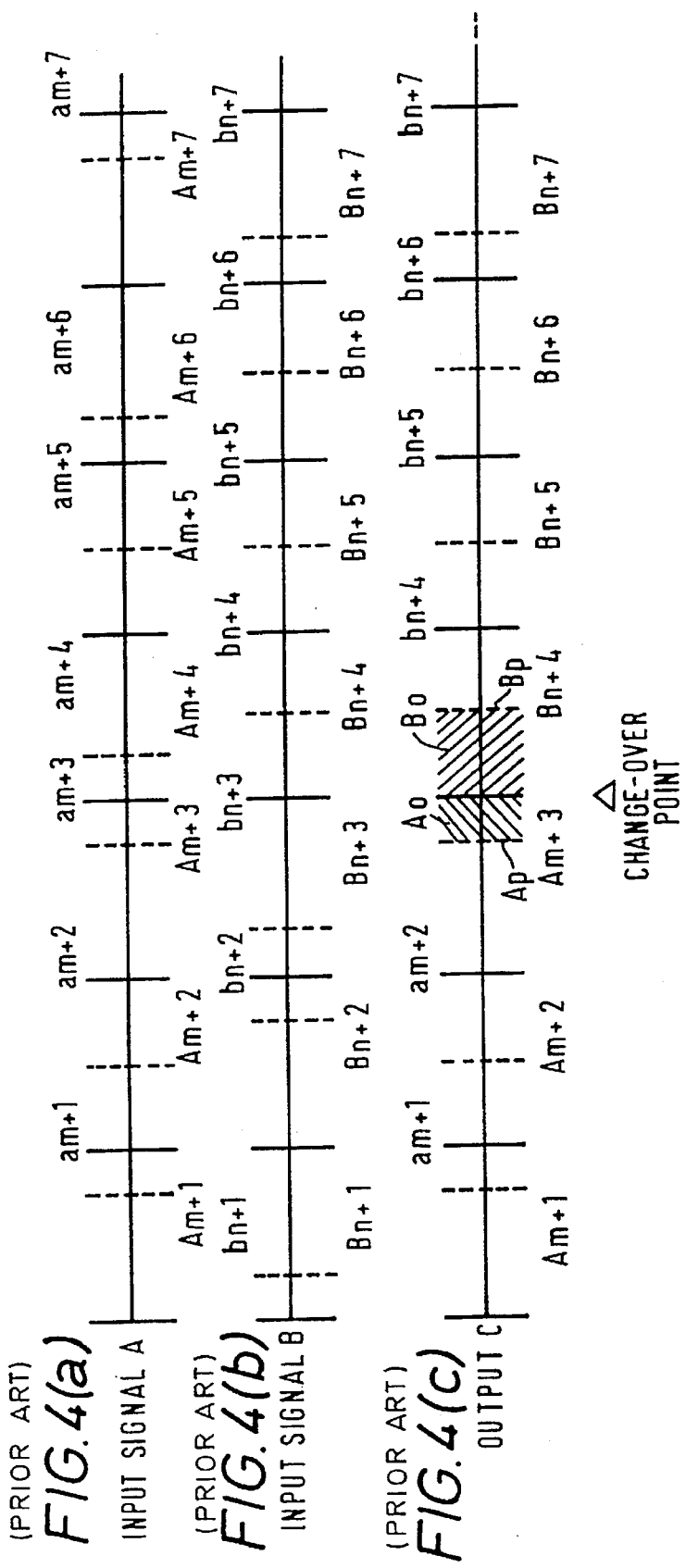

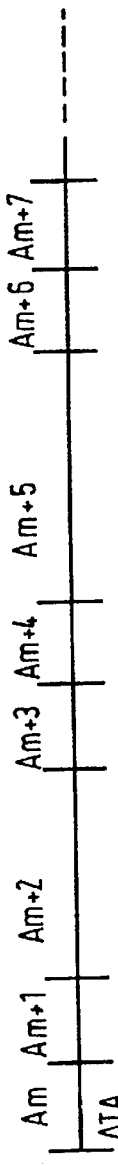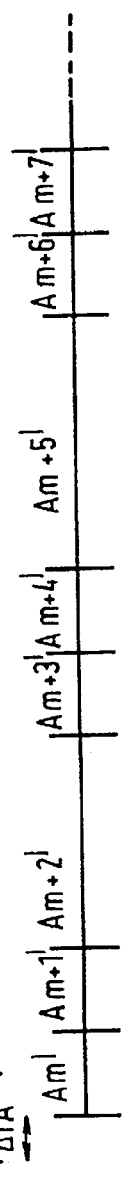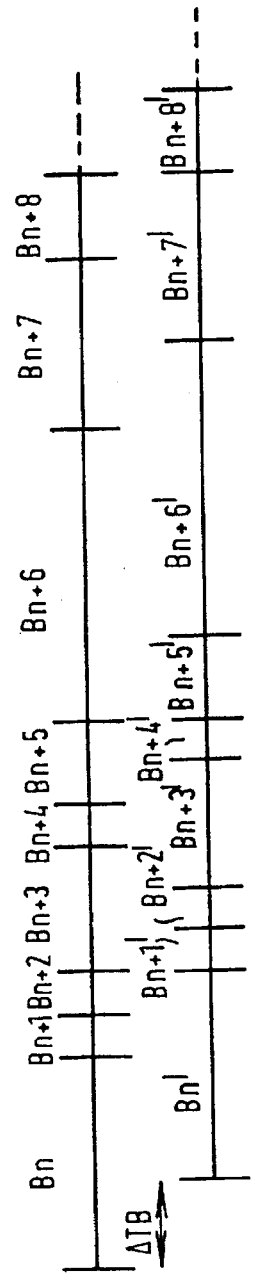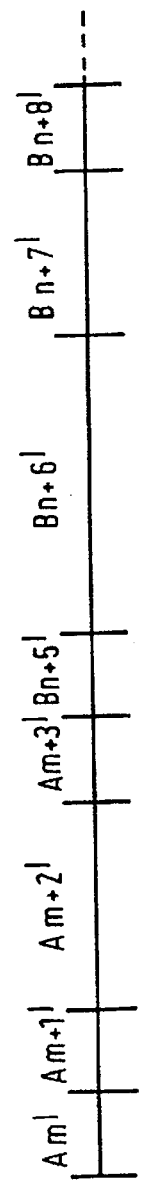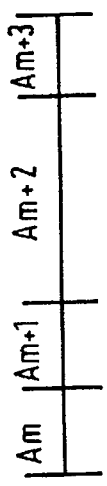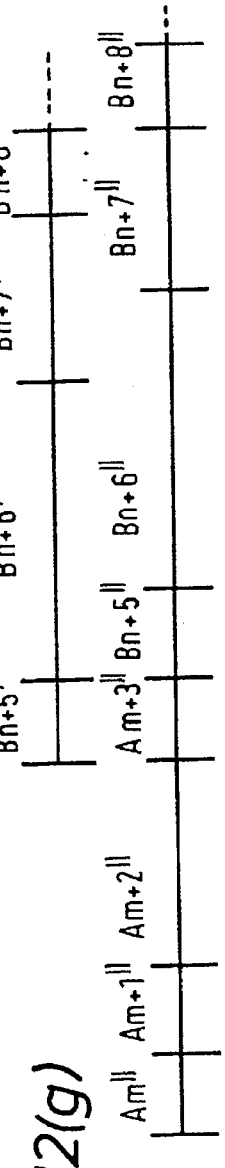
FIG.12(a) FIG.12(b) FIG.12(c) FIG.12(d) FIG.12(e) FIG.12(f) FIG.12(g) FIG.12(h)

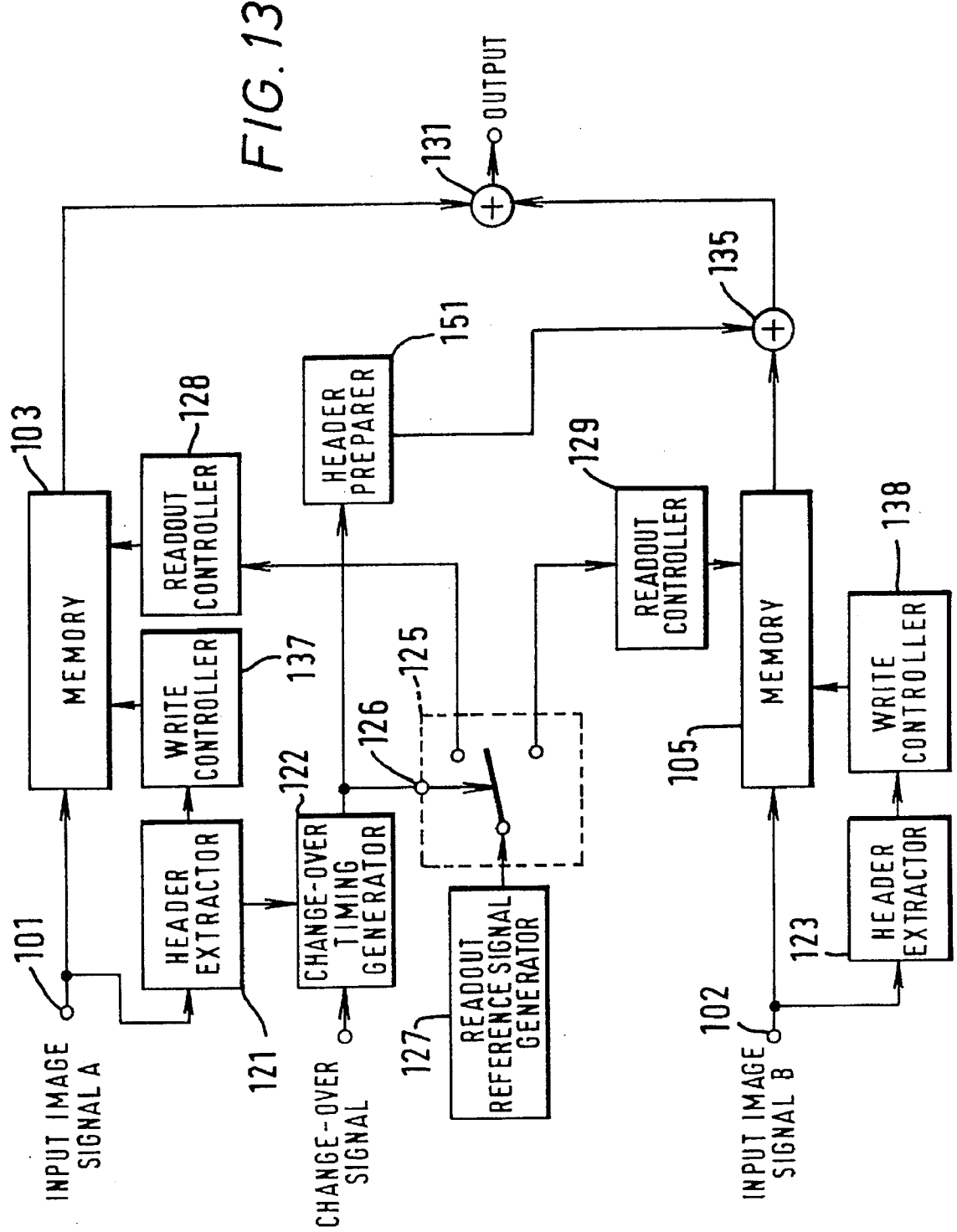

APPARATUS FOR DECODING EDITED CODED DATA

FIELD OF THE INVENTION

The present invention relates to an edited coded signal decoding apparatus which minimizes disturbances in a decoded edited video image.

BACKGROUND OF THE INVENTION

A conventional coded signal editing apparatus and edited coded signal decoding apparatus, particularly for use in video editing, is currently available in the market. This type of coded data editing apparatus is capable of creating a new image by rearranging a current image for a specified frame. It is also capable of creating a new image by properly connecting specified frames of a plurality of video signals.

FIG. 1 is a block diagram showing a coded data editing apparatus for editing baseband video signals. FIGS. 2(a) through 2(e) are timing charts for explaining the operation of a conventional coded data editing apparatus. FIG. 2(a) shows an input image signal A. FIG. 2(b) shows a time base adjusted form of the input image signal A. FIG. 2(c) shows an input image signal B. FIG. 2(d) shows a time base adjusted form of the input image signal B. FIG. 2(e) shows an edit output (signal change-over output) from the coded data editing apparatus.

Referring to FIG. 1 and FIGS. 2(a) through 2(e), the input image signal A, as shown in FIG. 2(a), is applied to an input terminal 1 in units of frames, i.e., frames Am, Am+1, Am+2, etc. successively. The input image signal B, as shown in FIG. 2(c), is applied to an input terminal 2 in units of frames, i.e., frames Bn, Bn+1, Bn+2, etc. successively. The input image signal A is applied to a buffer memory 3 and a sync separator 4 while the input image signal B is applied to a buffer memory 5 and a sync separator 6. The sync separators 4 and 6 separate sync signals from the input image signals A and B and apply the sync signals to write controllers 7 and 8, respectively. The write controllers 7 and 8 control the writing operations to buffer memories 3 and 5 using the sync signals of the input image signals A and B for storing the input image signals A and B in buffer memories 3 and 5, respectively.

Readout of data from buffer memories 3 and 5 is controlled by a readout controller 9. This readout controller 9 controls the readout of data stored in buffer memories 3 and 5 based on a reference signal given from a reference signal generator 10. As a result, the input image signal A is read from buffer memory 3 after being delayed by $\Delta TA$ and the input image signal B is read from buffer memory 5 after being delayed by $\Delta TB$, as shown in FIGS. 2(a) through 2(e). The time delays $\Delta TA$ and $\Delta TB$ synchronize input image signal A and input image signal B, respectively, with the reference signal. That is, the data read from buffer memories 3 and 5 are synchronized by the reference signal, and the frames Am', Am+1', etc. of the time base adjusted input image signal A are read out at the same rate as the frames Bn', Bn+1', etc. of the time base adjusted input image signal B, as shown in FIGS. 2(b) and 2(d).

The image signals read out of buffer memories 3 and 5 are applied to terminals a and b, respectively, of a switch 11, as shown in FIG. 1. Switch 11 selectively switches between terminals a or b by a change-over control signal that is applied through a terminal 12. For example, assume that the switch 11 has initially selected the terminal a and the output is the frames Am', Am+1', etc. based on the input image signal A. Once a change-over signal is applied through terminal 12, switch 11 will switch from terminal a to b in response to the change-over control signal at the change-over point between frames Am+2' and Am+3', etc. of the input image signal A, as shown in FIG. 2(e). After this change-over point, the switch 11 transmits the output from buffer memory 5 instead of buffer memory 3 and, as shown in FIG. 2(e), the frames Bn+3', Bn+4', etc. based on the input image signal B become the new output.

Since the base band video signals A and B have been synchronized prior to the change-over, the frames Am+2' and Bn+3' are output consecutively. Also, in this case it is also necessary to take the phase of a color subcarrier into consideration.

In recent years, a system for recording or transmitting image information by encoding at high efficiency has been of great interest. A proposed system is described in Japanese Patent Application Tokkai-Hei 4-14974 entitled "Moving Picture Coded Data Recording Method", which discloses an editing apparatus for editing high efficiency encoded (compressed) video signals in the as-coded state. In this prior art device, coded data for a moving picture is obtained by quantizing an input image signal after it is intra-frame coded or interframe coded. Moving picture coded data is edited in units of frame groups by defining a frame group as a specified number of frames and setting an edit flag for a frame group immediately after an edited group. The sequence of coded frames is changeable by detecting this edit flag.

The coded quantity of high efficiency coded data per frame differs depending on its pattern and on whether the encoding method is intraframe compression or interframe compression. Accordingly, for editing high efficiency encoded video signals, it is essential that the time bases of the frames before and after the change-over point are the same. In the proposed system described above, editing and decoding in units of frame groups is possible when high efficiency coded video signals are changed over (edited) for each frame by adjusting the time bases of the frames to agree with each other.

However, the above-mentioned system discloses a apparatus for editing only one video signal. With the increasing adoption of interframe compression for high efficiency encoding in addition to intraframe compression, decoding may become impossible when an edit is performed between two input image signals A and B. Interframe compression is a method using the interframe correlation, and only the differential value between the preceding and the current frame images is transmitted. Accordingly, a decoding result from a preceding frame is needed for decoding intraframe compression signals. However, when compression data of a specific frame of the input image signal A is changed over to interframe compression data by adjusting the time bases of both data to agree with each other, this interframe compression data cannot be decoded because there is no preceding frame image signal of the interframe compression data for input image signal B.

Further, when transmitting signals in units of packets, editing high efficiency coded signals and decoding editing signals may become difficult. FIGS. 3 and 4 are timing charts for explaining this problem.

FIG. 3(a) shows that a video signal is transmitted in units of packets, i.e., packets A-1, A-2, A-3, etc. FIG. 3(b) shows the video signal frames V-0, V-1, V-2, etc. included in the packets, as shown in FIG. 3(a). Each packet has a fixed word length, as illustrated by the solid vertical lines in FIG. 3. Each frame has been encoded in variable length and its coded quantity varies for each frame.

Now, it is assumed that the input image signal A is transmitted in units of packets, i.e., packets Am+1, Am+2, Am+3, etc. The boundaries between the frames am+1, am+2, am+3, etc. included in these packets are shown with broken lines in FIG. 4(a). Further, it is also assumed that the input image signal B is transmitted in units of packets, i.e., packets Bn+1, Bn+2, Bn+3, etc The boundaries between the frames bm+1, bm+2, bm+3, etc. included in these packets are also shown with broken lines in FIG. 4(b).

When an input image signal is transmitted in units of packets in this manner, the boundaries of video frames are unclear and consequently editing in units of video frames is difficult. Even if the boundaries of frames are clear, editing can be difficult. For example, when connecting frame am+2 of the input image signal A with frame bn+4 of the input image signal B, the boundary between these frames is between packets Am+3 and Bn+4, but when frame am+2 is connected to frame bn+4, subsequent packets must be prepared to transmit frames after this connection point at a fixed word length.

Therefore, it is necessary to edit in units of packets. FIG. 4(c) illustrates an example where packet Am+3 is connected to the packet Bn+4. After packets Am+3 and Bn+4 are connected, the edited data contains unnecessary parts AO and BO, which are the first half of the frame am+3 and the latter half of the frame bn+3, illustrated by the shadowed portions in FIG. 4(c). When decoding the output C after editing, all the unnecessary parts AO and BO from the point Ap in FIG. 4(c) are decoded after frames am+1 and am+2 are decoded. That is, after the video signals corresponding to the first half of the frame are decoded, the decoding of the unnecessary part BO of the next packet Bn+4 begins. However, it is unclear which part of frame bn+3 is the leading portion of the unnecessary part BO and which part is the data of the unnecessary part BO. Furthermore, it is uncertain whether the decoding process was properly carried out and disturbance of the final image is expected at this portion.

Further, the same problem exists in the editing of recorded signals in a VTR. FIG. 5 is a drawing for explaining this problem.

The recorded quantity on each recording track of a magnetic tape is fixed but data quantities of the video frames am+1, am+2, etc., and bn+1, bn+2, etc. are not fixed. Therefore, the boundary between video frames can lie at any position on a track, as shown in FIG. 5. Accordingly, when video signals of the tracks Am+3 and Bn+4 are connected to each other, the unnecessary part, as illustrated by the shadowed portion in FIG. 5, is produced. Even when the boundary between the frames am+2 and bn+4 is clear, removal of the unnecessary part is required by recoding data in the middle of the track, and it is usually impossible to remove the unnecessary part except in special cases. Consequently, a disordered image is produced on a reproduced image because of this unnecessary part.

As described above, when interframe compression signals were edited, the image became disordered as the interframe compression signals (a differential image signal) were decoded using a predictive original image signal that was not related to the interframe compression signals. In addition, when video signals recorded or transmitted in fixed word lengths of packets, etc. were edited, the image also became disordered when decoding the video signals.

SUMMARY OF THE INVENTION

It is therefore an object of the present invention to provide an edited coded signal decoding apparatus which is capable of preventing disturbance of an image at the edit point when interframe compression signals are edited and video signals in a fixed word length of packet, etc. are edited.

In order to achieve the above object, a coded data editing apparatus according to one aspect of the present invention is equipped with a first storage unit for storing a first coded video signal, a second storage unit for storing a second coded video signal, a readout controller for reading out the first and second coded video signals from the first and second storage means, respectively, by adjusting the time bases of the first and second coded video signals to agree with each other, and a header adder for adding an edit header to at least one of the first and second coded video signals.

Another aspect of the present invention is an edited coded signal decoding apparatus for decoding an input video signal. The input video signal has a sequence of first and second coded video signals, and an edit header added to at least one of the first and second decoded video signals before and after an editing point when the first and second coded video signals executed by interframe compression are edited at specified editing points. The apparatus is equipped with an edit header extractor for extracting an edit header from the input video signal, a decoder for decoding the first and second video signals in accordance with the extracted header and for outputting the decoded first and second video signals, and a substitute image replacer, responsive to the extracted header, for outputting a substitute image in place of a frame of decoding means output at a location corresponding to the frame where the second coded video signal after the editing point has been subjected to an interframe compression.

In the editing apparatus according to the present invention, data is read out by the readout controller to make the time bases of the first and second coded video signals agree with each other at the change-over point. The edit header is added to at least one of the first and second coded video signals before and after the change-over point.

In the edited signal decoding apparatus according to the present invention, when the edit header indicates that the second coded video signal after the editing point is an interframe compression signal, a signal for displaying an substitute image is output instead of the frame decoded signal. Thus, disturbance of image is prevented at the editing point. Further, when an editing signal is created, for instance by changing over the first and second coded video signals which are transmitted in units of packets, an invalid data portion is specified by the edit header and decoding of data corresponding to this invalid data portion is inhibited. In this way, only valid data is decoded to prevent disturbance of the image at the editing point.

Additional objects and advantages of the present invention will be apparent to persons skilled in the art from a study of the following description and the accompanying drawings, which are hereby incorporated and constitute a part of this specification.

BRIEF DESCRIPTION OF THE DRAWINGS

A more complete appreciation of the present invention and its advantages will be readily obtained as the invention becomes better understood by reference to the following detailed description when considered in connection with the accompanying drawings:

FIGS. 2(a) through 2(e) are timing charts for explaining the operation of the coded data editing apparatus shown in FIG. 1;

FIGS. 3A, 3B and 4A–4C are timing charts for explaining the problems in the system shown in FIG. 1;

FIG. 5 is a diagram for explaining problems in the system shown in FIG. 1;

FIGS. 12A–12H are diagrams for explaining the synchronization of two image signals A and B which are transmitted in units of frames;

FIGS. 13 and 14 are block diagrams showing the editing apparatus and edited signal decoding apparatus according to another embodiment of the present invention;

DESCRIPTION OF THE PREFERRED EMBODIMENTS

Figure 1:
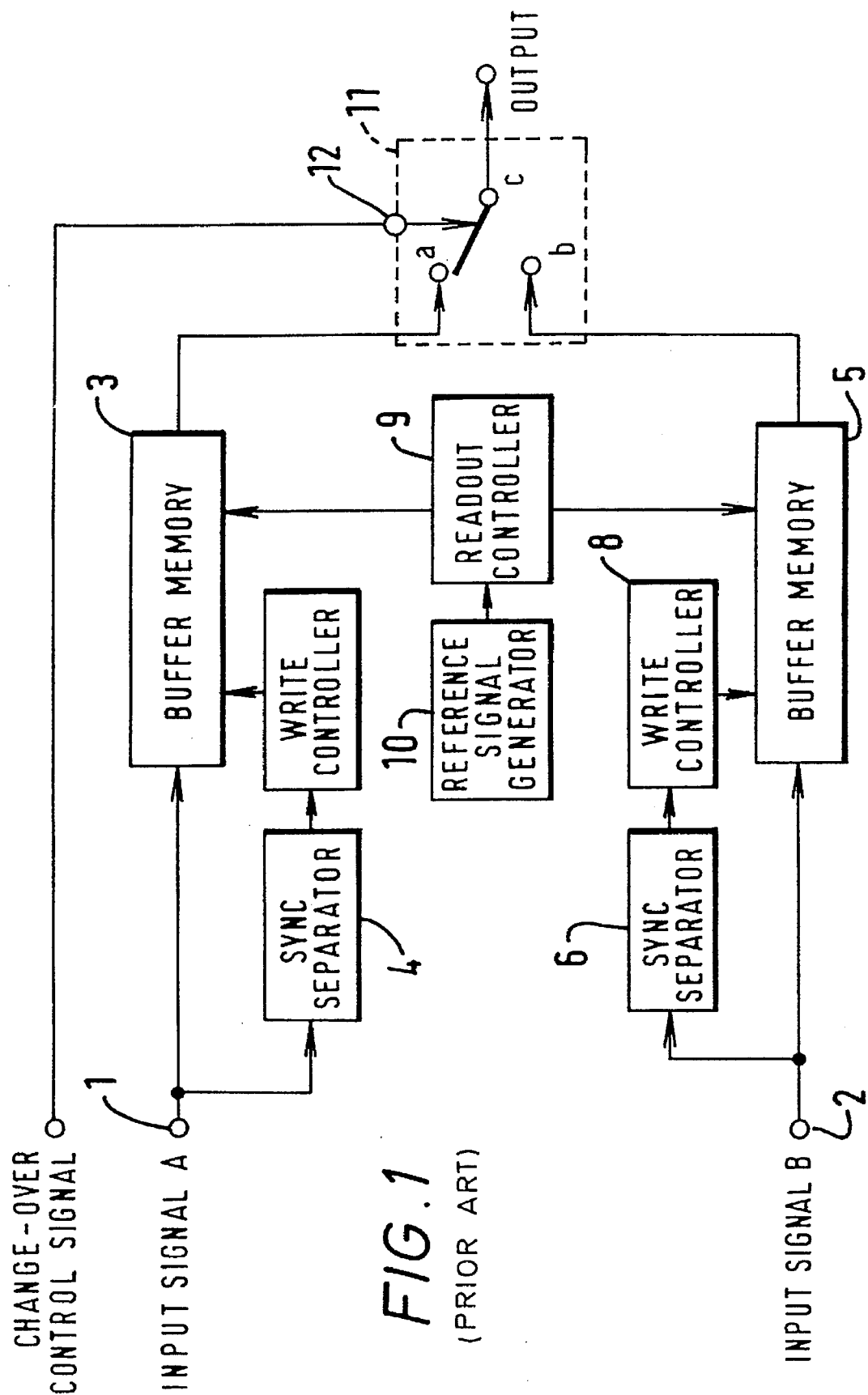
FIG. 1 is a block diagram showing a coded data editing apparatus for editing baseband video signals.

The present invention will be described in detail with reference to the FIGS. 6 through 18. Throughout the drawings, like or equivalent reference numerals or letters will be used to designate like or equivalent elements for simplicity of explanation.

Figure 6:
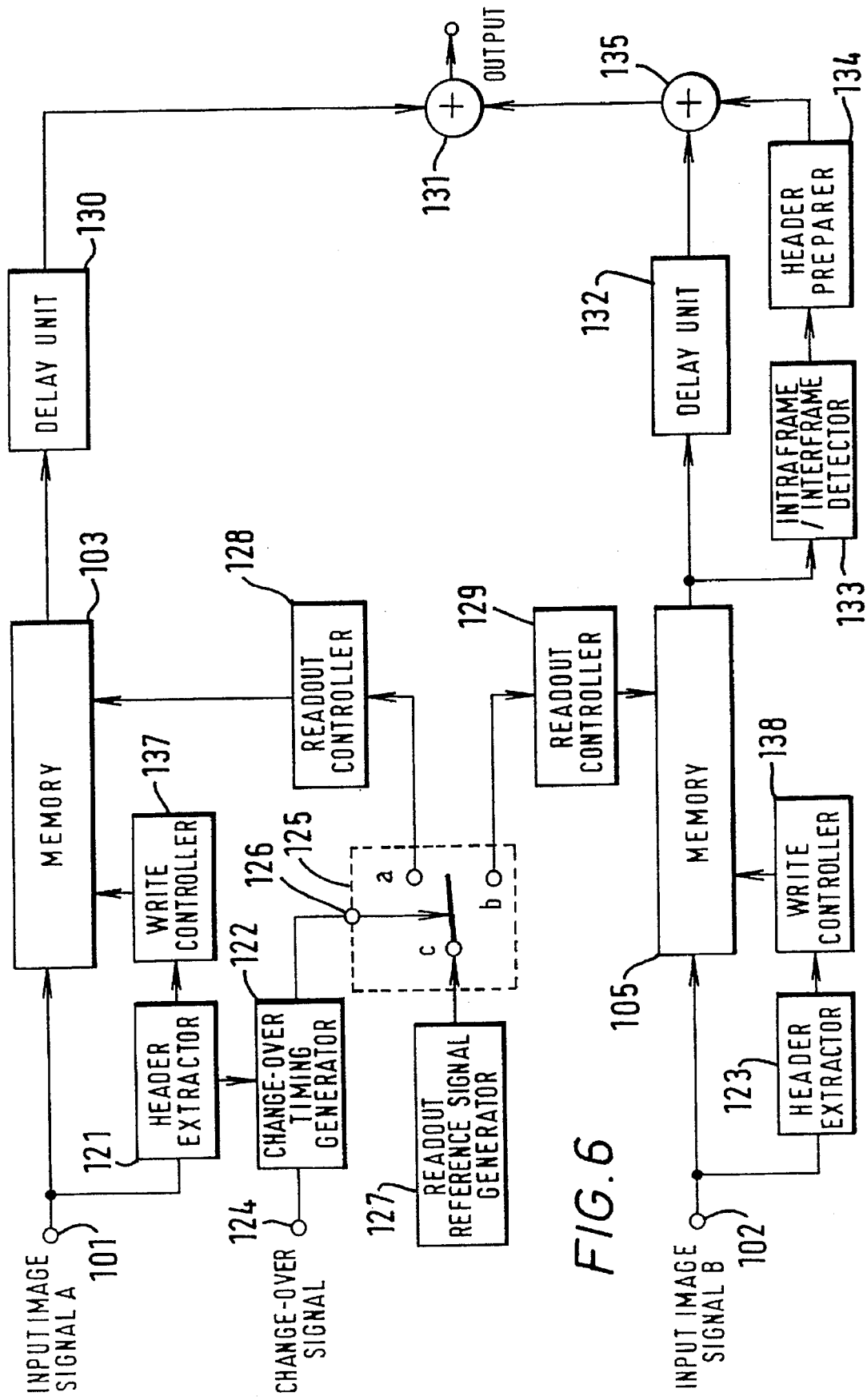
FIG. 6 is a block diagram showing one embodiment of the editing apparatus according to the present invention.
Figure 7:
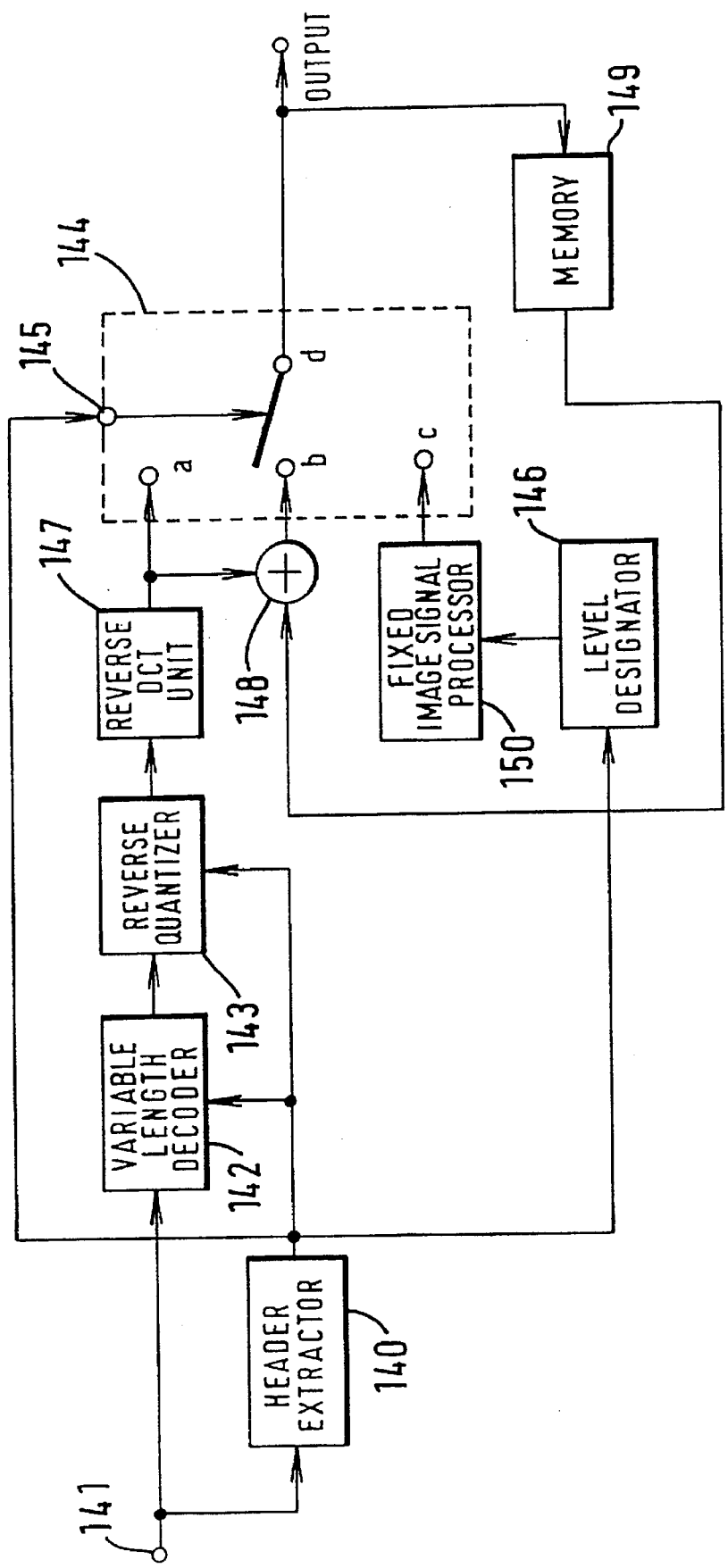
FIG. 7 is a block diagram showing the edited signal decoding apparatus for decoding the signals edited by the editing apparatus of FIG. 6.

FIG. 6 is a block diagram showing one embodiment of the editing apparatus according to the present invention. FIG. 7 is a block diagram showing the edited signal decoding apparatus for decoding the signals edited by the editing apparatus. In this embodiment, the edit is performed between compression input image signals A and B. In addition, it is assumed that the video signals do not have packets of fixed word lengths. The high efficiency coded input image signals A and B are applied to the input terminals 101 and 102, respectively. The input image signals A and B consist of an intraframe compression picture (hereinafter referred to as an "I picture"), a forward predictive picture which is obtained by interframe compression using a forward prediction (hereinafter referred to as a "P picture") and a bidirectional predictive picture (hereinafter referred to as a "B picture") which is obtained by the interframe compression using bidirectional prediction. In this embodiment, the B picture is processed in the same manner as the P picture, and a picture obtained by interframe compression will be explained as the P picture. Further, the number of interframes may be different between the image signals A and B.

The input image signal A that is given to the input terminal 101 is applied to a memory 103 and a header extractor 121. The header extractor 121 extracts a header contained in the input image signal A and outputs the header to a write controller 137 and a change-over timing generator 122. The header contains data indicating the location of the leading portion and end portion of each frame. The write controller 137 controls the writing operations of the input image signal A to memory 103 based on a header signal. Further, the input image signal B which is applied to input terminal 102 is also applied to a memory 105 and a header extractor 123. The header extractor 123 extracts a header contained in the input image signal B and outputs the header to the write controller 138. Thus, the write controller 138 controls the writing operations of the input image signal B into the memory 105 based on this header signal.

A change-over signal generated immediately before the change-over point is applied to a terminal 124. This change-over signal is applied to the change-over timing generator 122. The change-over timing generator 122 obtains the frame end timing from the header and outputs a timing signal to a terminal 126 of a switch 125 at the frame end point immediately after the change-over signal is input. A readout reference signal generator 127 generates a reference signal applied to terminal c of the switch 125 to control data readout from the memories 103 and 105. The switch 125 switches between terminals a and b at the time a timing signal is applied to its terminal 126. The switch allows the readout reference signal to reach one of the readout controllers 128 and 129.

The readout controllers 128 and 129 control the readout operation of data from memories 103 and 105, respectively, based on the readout reference signal. The image signal A read out of memory 103 is given to an adder 131 through a delay unit 130. The image signal B read out of memory 105 is given to an adder 135 through a delay unit 132 and also to an intraframe/interframe detector 133. The intraframe/interframe detector 133 checks whether the readout image data is intraframe compression frame data ("intraframe data") or interframe compression frame data ("interframe data") and outputs the result of this detection to a header preparer 134. The header preparer 134 prepares an edit header to be added to interframe data and outputs the edit header to the adder 135. The edit header is represented by 1 bit for every unit of compensation process.

The delay unit 132 reads image signal B out of the memory 105 and outputs image signal B to the adder 135 by delaying it so that an edit header can be added to the leading portion of a frame. The adder 135 outputs the interframe data of the image signal B and the added edit header to an adder 131. The delay unit 130 outputs the image signal A from the memory 103 to the adder 131 by delaying it for a time equivalent to the delay time of the delay unit 132 and the processing time of the adder 135; in other words, image signals A and B are delayed for the same amount of time. The adder 131 multiplexes the output of the delay unit 130 and the output of the adder 135.

Figure 8:
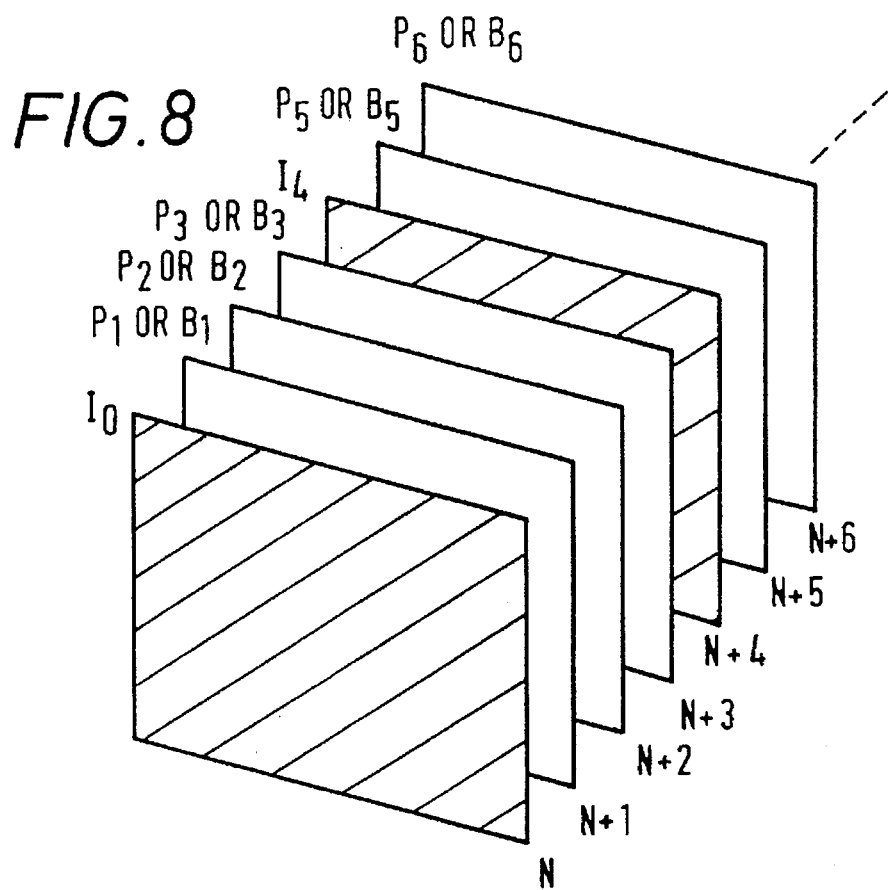
FIG. 8 is a diagram for explaining the operation of the editing apparatus of FIG. 6.

Referring now to FIG. 8, the operation of the editing apparatus which is constructed as described above will be explained.

The input image signals A and B to be given to the input terminals 101 and 102 are comprised of four frames Am through Am+3, and Bn through Bn+3, each of which is composed of one intraframe I0 and three interframes P2 through P4 and thereafter. One intraframe (shadowed section) is provided for every four frames. The input image signals A and B which go through input terminals 101 and 102 are applied to memories 103 and 105, respectively, and also to the header extractors 121 and 123 for extracting a header from each input image signal A and B. The write controllers 137 and 138 control the writing operations to memories 103 and 105 based on write signals contained in the headers.

Now, assuming that the frame Bn+5 of the input image signal B is connected after the frame Am+3 of the input image signal A, the switch 125 selects the terminal a. The readout reference signal from the readout reference signal generator 127 is supplied to the readout controller 128 via the switch 125, and the data of the frames Am, Am+1, Am+2 and Am+3 stored in the memory 103 are read out successively and output to the delay unit 130 by the readout controller 128. When a change-over signal is given to the change-over timing generator 122 through terminal 124 immediately before the end point of frame Am+3, the change-over timing generator 122 obtains the frame end point according to a header from the header extractor 121 and gives a timing signal to terminal 126 of switch 125 at the end point of the frame Am+3. As a result of the timing signal, switch 125 switches from terminal a to terminal b and sends the readout reference signal to the readout controller 129. The readout operation of data from memory 105 is controlled by the readout controller 129. The data for frame Bn+5 is output to adder 135 through the delay unit 132. The change-over to frame Bn+5 based on the input image signal B may be decided by an external signal (not shown) or by internally obtaining a timing that is closest to the frame Am+3.

The frames Bn+5, Bn+6, etc. which are read out of the memory 105 are sent to the intraframe/interframe detector 133. The intraframe/interframe detector 133 detects whether the data of the frames Bn+5, Bn+6, etc. are intraframe data or interframe data and outputs the detected result to the header preparer 134. Based on the result of this detection, the header preparer 134 prepares an edit header indicating whether or not the frames are interframe data and outputs edit header to the adder 135. The frame data delayed by delay unit 132 has already been given to adder 135. Adder 135 outputs this frame data to adder 131 with a header added to its leading portion. Thus, following the frames Am, Am+1, Am+2, Am+3, etc., the adder 131 multiplexes and outputs the frames Bn+5, Bn+6, etc. added with the edit header showing whether or not the encoding method is interframe compression.

In this manner, the editing is performed for every frame and interframe data occurring after the connection point is added with an edit header indicating that the data is interframe compression data.

Figure 9:
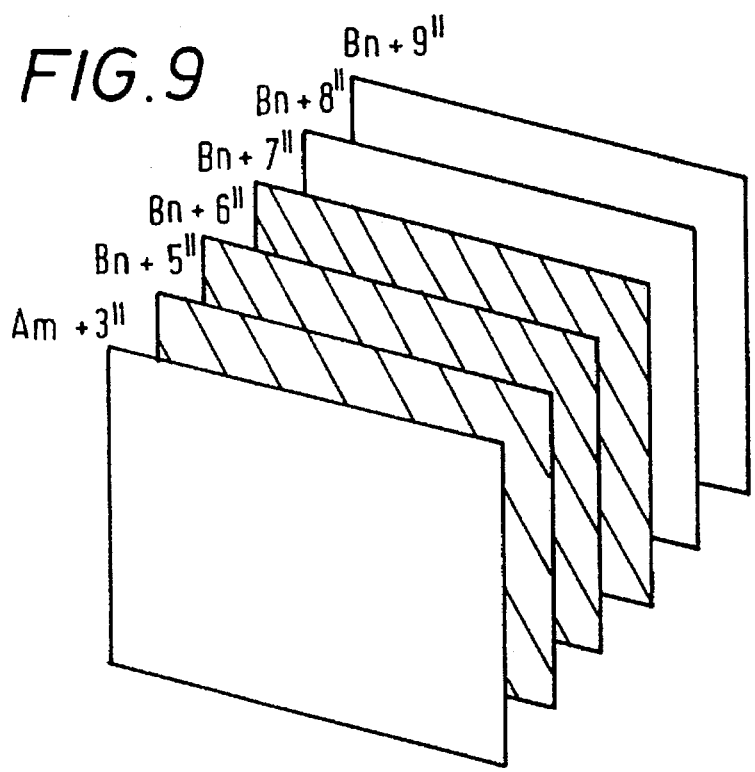
FIG. 9 is a diagram for explaining the decoding method of the edited signal decoding apparatus according to embodiments of the present invention.

Referring now to FIG. 9, the decoding method of the edited signal decoding apparatus according to the present invention will be explained.

As described above, it is assumed that the frame Bn+5 based on the input image signal B is connected after frame Am+3 based on the input image signal A. The edited frames Am+3", Bn+5", Bn+6", Bn+7", Bn+9", Bn+10", etc. form the P picture while the frames Bn+8", Bn+12", etc. form the I picture. For the I picture, decoding is possible using that image only; for the P picture, the original image cannot be restored since a predictive image, which is required for decoding, does not exist. So, in this embodiment, substitute images prepared in advance (for instance, a black image of a specified level) are used as replacements for these missing predictive images. That is, the substitute images are displayed at the editing boundary (when a video is changed over) on the frame and an effect similar to a fade effect is obtained.

In FIG. 7, the editing signal from adder 131, as shown in FIG. 6, is given to an input terminal 141. Here, it is assumed that the input image signals A and B are encoded in variable length, such as Huffman coding, after a DCT (Discrete Cosine Transformation) process and quantizing process. The editing signal is given to a variable length decoder 142 and a header extractor 140. The header extractor 140 extracts an edit header from the editing signal, decodes various header signals and quantizing information, and outputs the data to the variable length decoder 142, a reverse quantizer 143, a terminal 145 of a switch 144 and a level designator 146.

The variable length decoder 142 decodes the editing signal in variable length based on the header information and sends the editing signal to reverse quantizer 143. The reverse quantizer 143 reverse quantizes the output of the variable decoder 142 and outputs the result to the reverse DCT unit 147. The reverse DCT unit 147 reverse DCT processes this reverse quantizing output and outputs the result to terminal a of switch 144 and an adder 148.

Switch 144 selects terminals a, b or c based on the header information provided from the header extractor 140. That is, the switch 144 selects terminal a when the header information indicates intraframe data and selects terminal b when the header information indicates interframe data. Further, when the edit header indicates the occurrence of interframe data before intraframe data and after the editing point, the switch 144 selects terminal c. The signal from terminal d of the switch 144 is output as a decoded signal and applied to a memory 149.

The memory 149 outputs the decoded signal to the adder 148 after storing it for a period of one frame. The adder 148 adds the decoded output (a differential signal) of the interframe data from the reverse DCT unit 147 to the decoded output of the preceding frame from memory 149 in order to regenerate the current frame data. The adder then outputs the current frame data to terminal b of switch 144.

In this embodiment, the edit header from header extractor 140 is also given to a level designator 146. The level designator 146 outputs a specified fixed image signal value to a fixed image signal processor 150 according to the edit header at a time in an interframe which occurs before an intraframe and after the editing point. The fixed image signal processor 150 outputs an image signal for displaying an image at a specified level to the output terminal c of switch 144. The specified level is based on a fixed image signal value from the level designator 146. Further, the level designator 146 may be omitted. In addition, the output from the level designator 146 may not necessarily be controlled according to the edit header.

Now the operation of the above embodiment will be explained. The editing signal that is sent through terminal 141 is given to the header extractor 140 for extracting a header. Here, it is assumed to decode the frames Am+3", Bn+5", Bn+6", etc. after the image signals A and B are edited, as shown in FIG. 9. The frame Am", which is an intraframe, is restored to its original signal before it is encoded by the variable length decoder 142, the reverse quantizer 143 and the reverse DCT unit 147. The frame Am" is supplied to terminal a of switch 144. The switch 144 selects terminal a according to the header information from the header extractor 140 and outputs the decoded data of the frame Am".

When frames Am+1", Am+2" and Am+3" are input, switch 144 selects terminal b. The output from the reverse DCT unit 147 in this case is a differential value with the preceding frame. The adder 148 decodes the original signal by adding the decoded signal of the preceding frame Am", Am+1" or Am+2" to the output of the reverse DCT unit 147 and outputting the decoded original signal to terminal c. Thus, the decoded output is obtained at terminal d of the switch 144.

Next, frame Bn+5" is an interframe after the editing point and switch 144 selects terminal c according to the edit header. The level designator 146 outputs, for instance, a black level signal to the fixed image signal processor 150, and the fixed image signal processor 150 outputs the black level image signal through terminal c of switch 144. A similar operation is performed in the next frames Bn+6" and Bn+7".

Then, when frame Bn+8" is input, the switch 144 selects terminal a according to the header information. Frame Bn+8" is an intraframe and the switch 144 outputs the decoded output from the reverse DCT unit 147. Then, when frame Bn+9" is input, the switch 144 selects terminal b and obtains the decoded output by selecting the output from the adder 148.

Thus, in this embodiment, for interframe data occurring before intraframe data and after the editing point, a fixed image signal is output without decoding signals. This prevents disturbance of the image immediately after the editing point. Further, it is possible to designate a substitute image level which is displayed by the level designator 146 and to obtain an effect similar to the fade effect.

Figure 10:
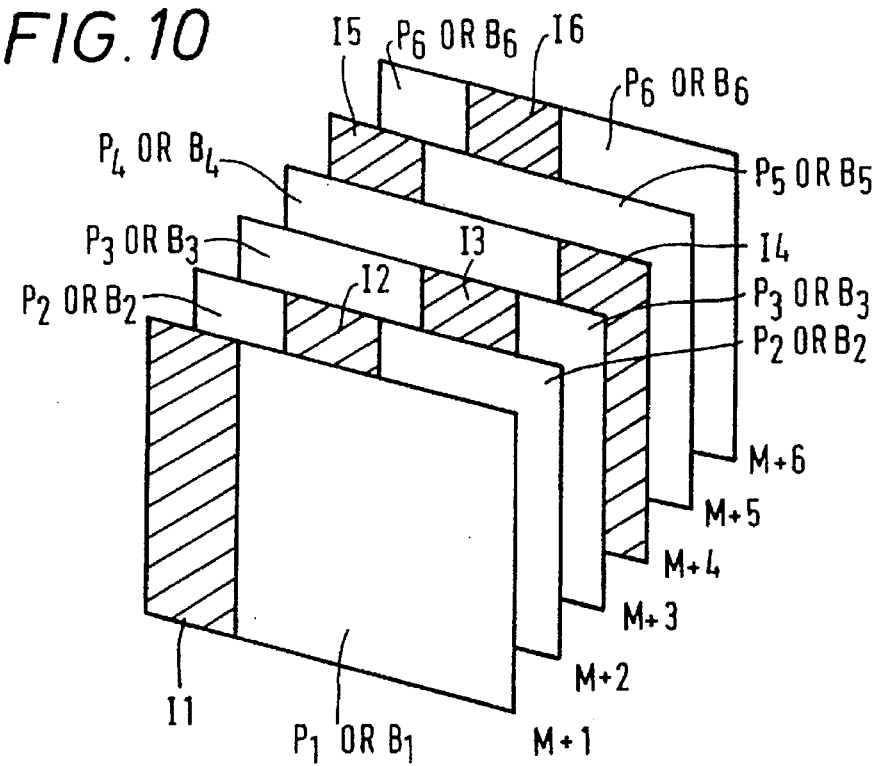
FIGS. 10 and 11 are diagrams for explaining a case where the coded signals are given to the editing apparatus, and intraframe data and interframe data are compressed within one frame without discriminating between them as being intraframe or interframe data for each frame.
Figure 11:
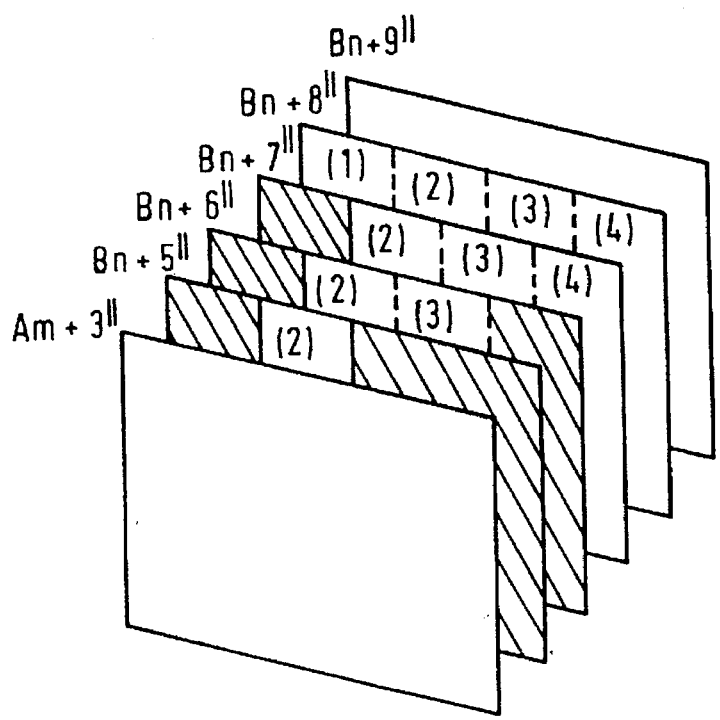

FIGS. 10 and 11 show an example where coded signals are given to the editing apparatus and intraframe data and interframe data are compressed within one frame without discriminating between intraframe or interframe data for each frame. Thus, the data transmission rate after encoding is averaged.

As shown by the shadowed portion in FIG. 10, the intraframe compression frame I is divided into five parts I1 through I5, which are arranged in specified regions of the interframe compression frame P (or B). The frame M+1 is composed of intraframe compression frame I1 data and interframe compression frame P1 data. Frame M+2 arranges intraframe compression frame I2 data between interframe compression frames P2 and P2. Similarly, for frames M+3 and M+4, intraframe compression frame I3 is arranged between interframe compression frames P3 and P3, and for frames M+4 and M+5, interframe compression frames I4 and P5 and indraframe compression frames I4 and I5 are respectively arranged in a similar manner. It is thus possible to encode all regions by arranging the intraframe compression frames circularly in a five frame rotation.

This embodiment is best suited for coded data editing. In FIG. 10, it is now assumed that the image signals A and B are circularly arranged by dividing an intraframe compression frame and that four parts are to be edited. That is, by connecting frame Am+3 based on the image signal A with frame Bn+5 based on the image signal B in units of frames, the edited frames Am+3", Bn+5", Bn+6'l, Bn+7", Bn+8", etc. are obtained (FIG. 11).

Frame Am+3" can be decoded using the preceding frame Am+2". Section (2) of the next frame Bn+5", as shown in FIG. 11, is intraframe data, while the other sections (shadowed section) are interframe data. The switch 144 selects terminal a according to the header information from the header extractor 140 when data corresponding to section (2) of the intraframe data is input. Switch 144 then selects terminal c when data corresponding to the other sections are input. Thus, when a display is made using the decoded output of frame Bn+5", an image corresponding to the image signal B is displayed for the part of the screen corresponding to section (2), and a substitute image is displayed for the other sections based on the output from the fixed image signal processor 150.

The decoded output of frame Bn+5" is sent to memory 149 for storage. When decoding the next frame Bn+6", a decoded output corresponding to section (2) stored in memory 149 is used. That is, the switch 144 selects terminal b at a time corresponding to section (2) according to the header information, reads the decoded output of the section (2) out of the memory 149 via the adder 148, and outputs it. Next, when data (intraframe data) corresponding to section (3), as shown in FIG. 11, is input, the switch 144 selects terminal a and outputs the decoded output from the reverse DCT unit 147. The other sections (shadowed portions) of frame Bn+6" are interframe data, and switch 144 selects terminal c at the time of data input and outputs a signal to display a substitute image. When the substitute image is displayed using the decoded output of frame Bn+6", images corresponding to the image signal B are displayed on parts of the screen corresponding to sections (2) and (3), and the substitute image is displayed for the other sections.

Thereafter, the decoded sections of the interframe are increased successively in the similar manner. That is, sections (4) and (1) in frames Bn+7" and Bn+8" are intraframe data and the other sections (shadowed portion) are interframe data. When decoding frame Bn+7", the decoded outputs for sections (2) and (3) obtained by decoding frames up to the preceding frame are used, and at the same time the decoded output of section (4) is output. Then, when decoding frame Bn+8", the decoded outputs for sections (2), (3) and (4) which were obtained by decoding frames up to the preceding frame are used and at the same time, the decoded output of section (1) is selectively output. Thus, one picture plane of the image signal B is reproduced in four frame periods.

Thus, in this embodiment it is possible to reproduce the original image although there is a certain time lag. Further, since all sections of a substitute image are successively replaced in the image signal B until the image signal B is completely reproduced after the editing, a viewer can enjoy a complete visual effect at the editing point.

In the same manner as in decoding frame Bn+6" where section (2) of frame Bn+5" was used directly in frame Bn+6", the decoded output of the preceding frame is used directly in the above explanation. However, when section (2) of frame Bn+5" corresponding to section (2) of frame Bn+6" is available as a predictive image, it is clearly better to update the section (2) by adding the decoded output of the section and a differential value in the adder 148.

Further, the B picture is not considered in this embodiment. When the B picture is the frame before the editing point of the image signal A, this B picture cannot be reproduced since there is no predictive image for the B picture. In this case, a substitute image can be used for image signal A. FIG. 12 is a drawing for explaining the synchronization of two image signals A and B which are transmitted in units of frames. FIG. 12(a) shows the input image signal A. FIG. 12(b) shows the time adjusted image signal A. FIG. 12(c) shows the input image signal B. FIG. 12(d) shows the time adjusted image signal B. FIG. 12(e) shows the editing output using the time adjusted image signals A and B. FIG. 12(f) shows the writing operations to the memory 103. FIG. 12(g) shows the writing operations to the memory 105. And FIG. 12(h) shows the edited output.

The encoded quantity of each frame Am, Am+1, Am+2, etc. and Bn, Bn+1, Bn+2, etc. of the input image signals A and B, as shown in FIGS. 12(a) and 12(c), is indefinite. So, in order to make the editing points of image signals A and B agree with each other, the image signals A and B are written into memories, then delayed by ΔTA and ΔTB, respectively, (FIGS. 12(b), 12(d)) by reading the image signals out in units of frames. The editing points are the ending point of frame Am+3' and the starting point of frame Bn+5', and these points agree with each other in time, as shown in FIGS. 12(b) and 12(d). By switching between the outputs of the memories storing the image signals A and B, the edited output, as shown in FIG. 12(e), is obtained.

It is possible to connect image signals A and B without considering the delay times ΔTA and ΔTB by noting the read addresses corresponding to the editing points while writing the image signals A and B in units of frames into memories 103 and 105, as shown in FIG. 6. That is, memory 103 outputs frames Am, Am+1, Am+2, etc. of the image signal A (FIG. 12(f)) written in units of frames either directly or by delaying them (FIG. 12(h)). On the other hand, the image signal B is stored in memory 105 in units of frames (FIG. 12(g)). Memory 105 starts to read frame Bn+5 of the image signal B out of the storing address at the same time that the readout operation of frame Am+3 from memory 103 ends. As a result, frames Am+3 and Bn+5 are connected and the image signals A and B are synchronized, as shown in FIG. 12(h). Further, in order to obtain a readout starting position, it is necessary to make catching the end point of each frame at the writing operations into the memories possible.

Figure 14:
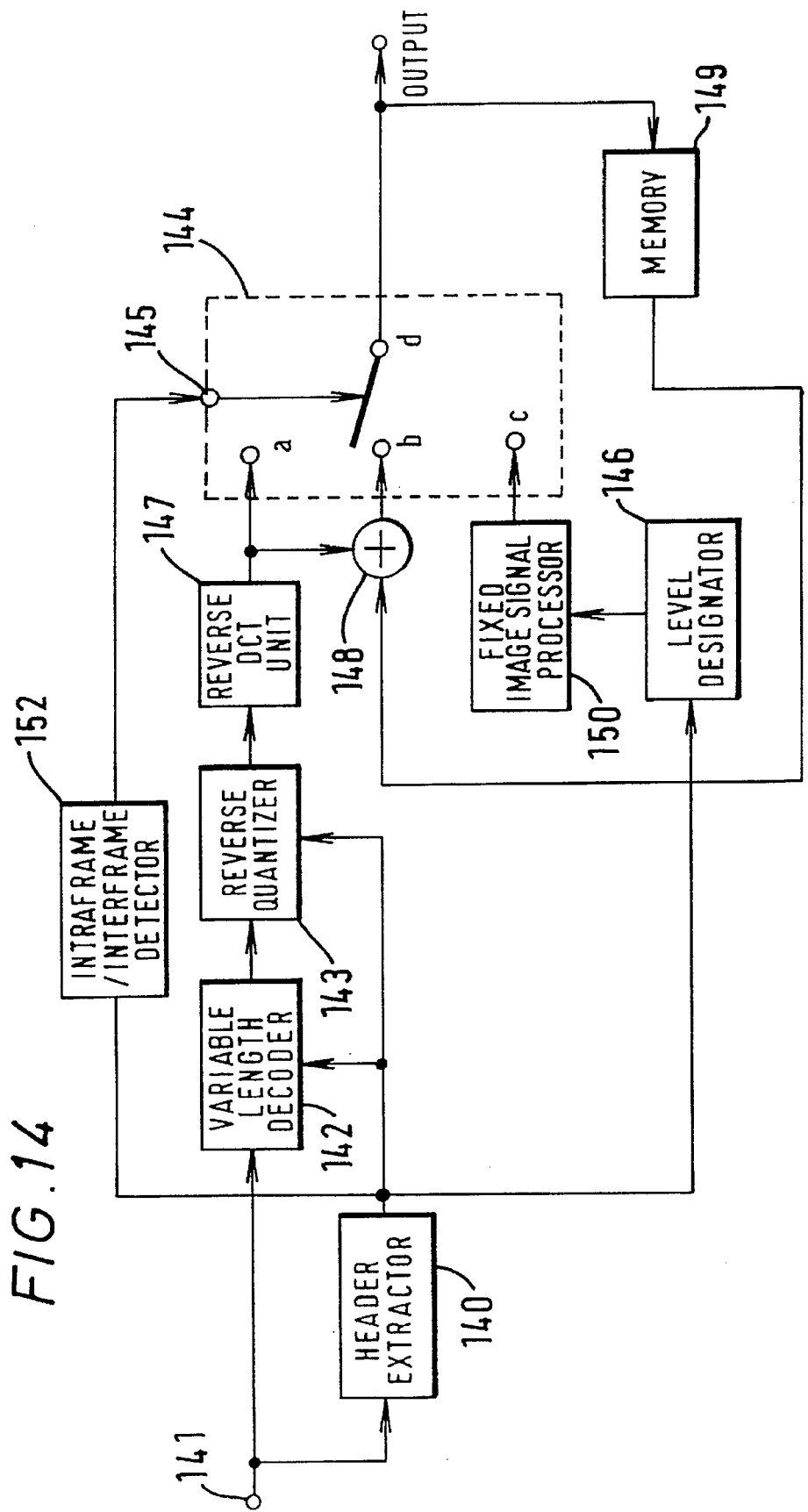

FIGS. 13 and 14 are block diagrams showing the editing apparatus and the edited signal decoding apparatus, respectively, according to another embodiment of the present invention. In FIGS. 13 and 14, the same elements as in FIGS. 6 and 7 are given the same numerals, and the explanations for these elements will be therefore be omitted to avoid redundancy.

In the embodiment shown in FIGS. 6 and 7, a method for adding an edit header by investigating frames for replacement by a substitute image at the time of editing was described. In the embodiment shown in FIGS. 13 and 14, frames to be replaced with a substitute image are identified at the time of decoding instead of at the time of editing. The editing apparatus in this embodiment eliminates the intraframe/interframe detector. The image signal B read from the memory 105 is sent directly to the adder 135. The output from the change-over timing generator 122 is also sent to the header preparer 151, and the header preparer 151 prepares a header signal and outputs it to the adder 135. Adder 135 outputs the image signal B to the adder 131 with the header signal added.

In the editing apparatus of this embodiment, a header is simply added to each frame.

On the other hand, the edited signal decoding apparatus of this embodiment differs from that shown in FIG. 7 in that the intraframe/interframe detector is added. The header information from the header extractor 140 is given to the intraframe/interframe detector 152, which in turn detects whether the input frame is intraframe or interframe according to the header information. At the same time, the intraframe/interframe detector 152 controls the switch 144 by detecting whether or not the input frame is an interframe or an intraframe and by detecting whether the input frame is interframe prior an intraframe.

In this embodiment, even when the edited signal is not added with an edit header indicating that there is an interframe immediately after the editing point, the switch 144 is controlled by the intraframe/interframe detector's 152 detection of this interframe. Other operations and effects are the same as the embodiment as shown in FIGS. 6 and 7.

Figure 15:
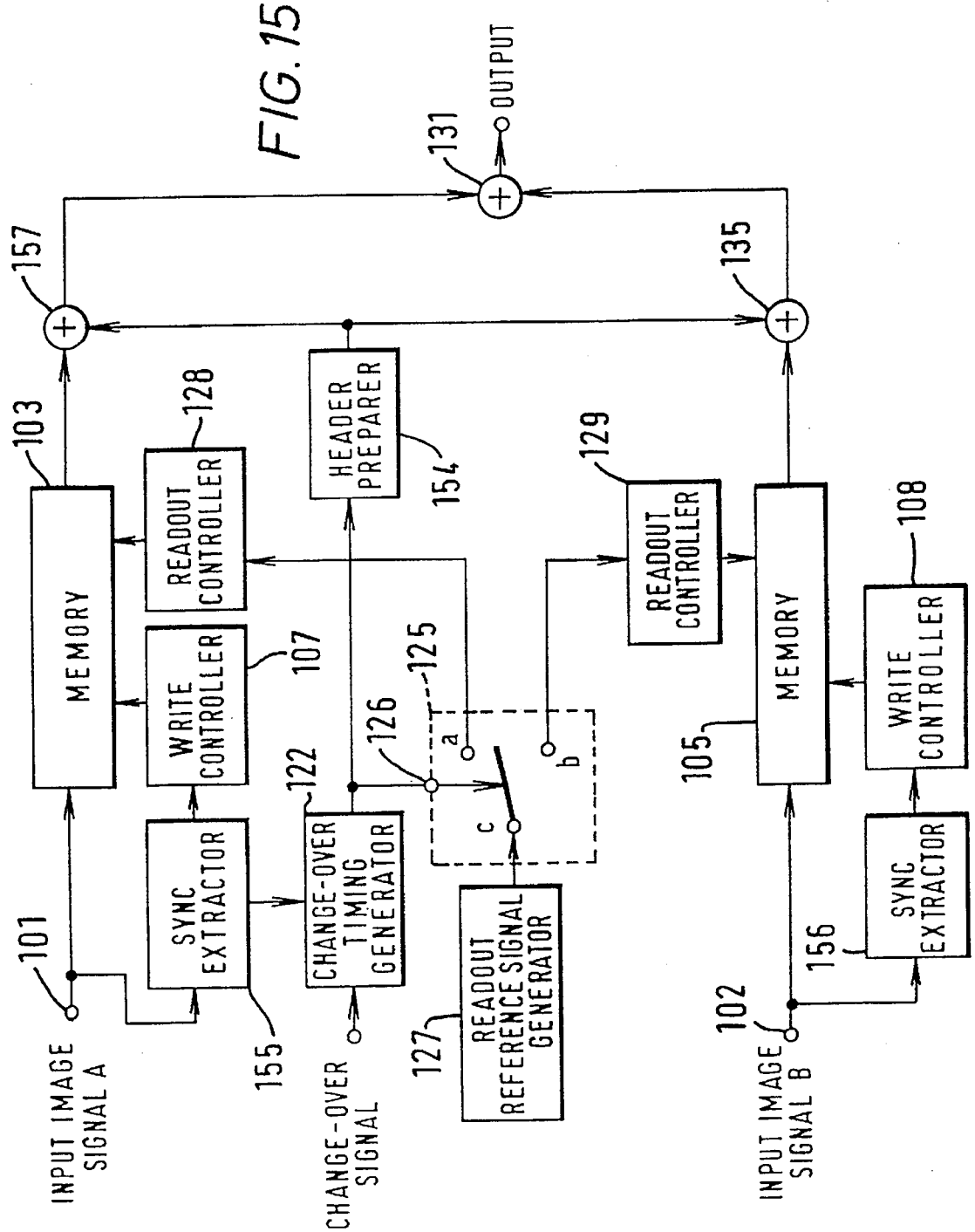
FIGS. 15 and 16 are block diagrams showing the editing apparatus and edited signal decoding apparatus according to still another embodiment of the present invention.
Figure 16:
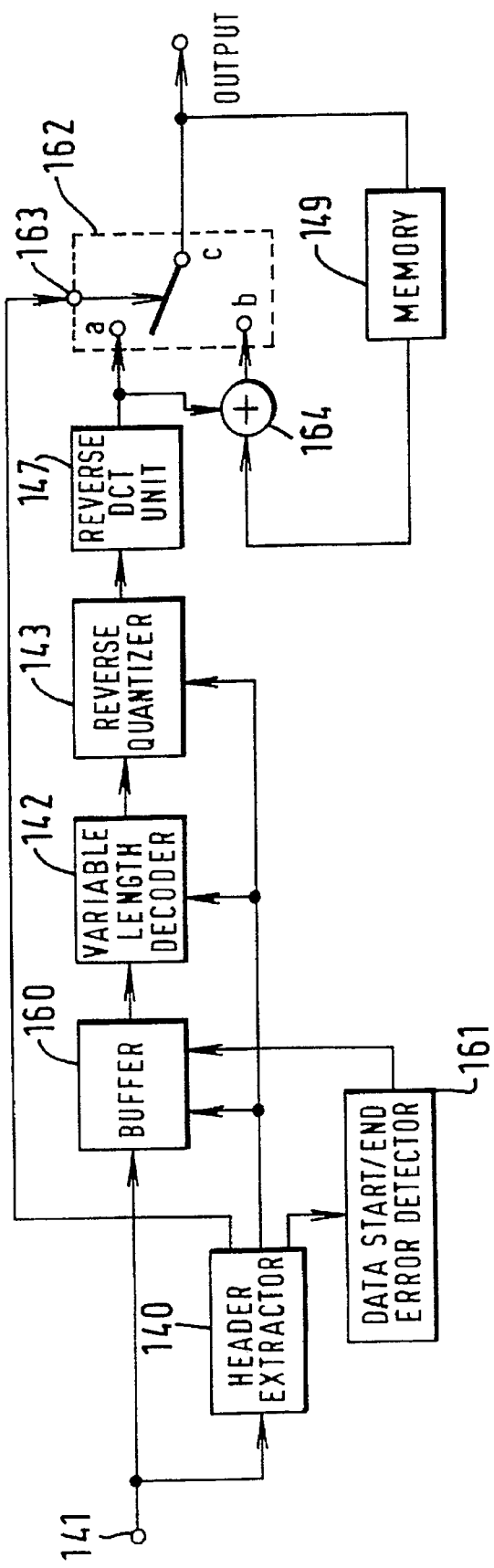

FIGS. 15 and 16 are block diagrams showing the editing apparatus and the edited signal decoding apparatus, respectively, according to one embodiment of the present invention. In FIGS. 15 and 16, the same elements as in FIGS. 7 and 13 are given the same numerals, and the explanations for these elements will therefore be omitted to avoid redundancy.

The embodiments in the previous examples are cases when the image signals A and B are not divided into packets. However, this embodiment will be explained for a case where the image signals A and B have been divided into packets. Even when image signals are transmitted in units of packets, it is possible to add a header to each of the image signals A and B.

The editing apparatus according to this embodiment employs synchronous extractors 155 and 156 instead of a header extractor. The synchronous extractors 155 and 156 receive the input image signals A and B through input terminals 101 and 102. After separating out a sync signal, the synchronous extractors 155 and 156 output the sync signal to write controllers 7 and 8 and the change-over timing generator 122. A packet can be further divided into smaller units by the sync signal. The write controllers 107 and 108 control the writing operations of the image signals A and B into memories 103 and 105. When a change-over signal is given, the change-over timing generator 122 outputs a timing signal for inserting an edit header into a packet at the editing point to the header signal preparer 154. The header signal preparer 154 prepares a header including an edit header indicating that the editing was performed. The header signal preparer 154 then outputs this header to adders 135 and 157. The adder 157 outputs the image signal A from memory 103 to the adder 131 with a header from the header preparer 151 added to the image signal A.

Figure 17:
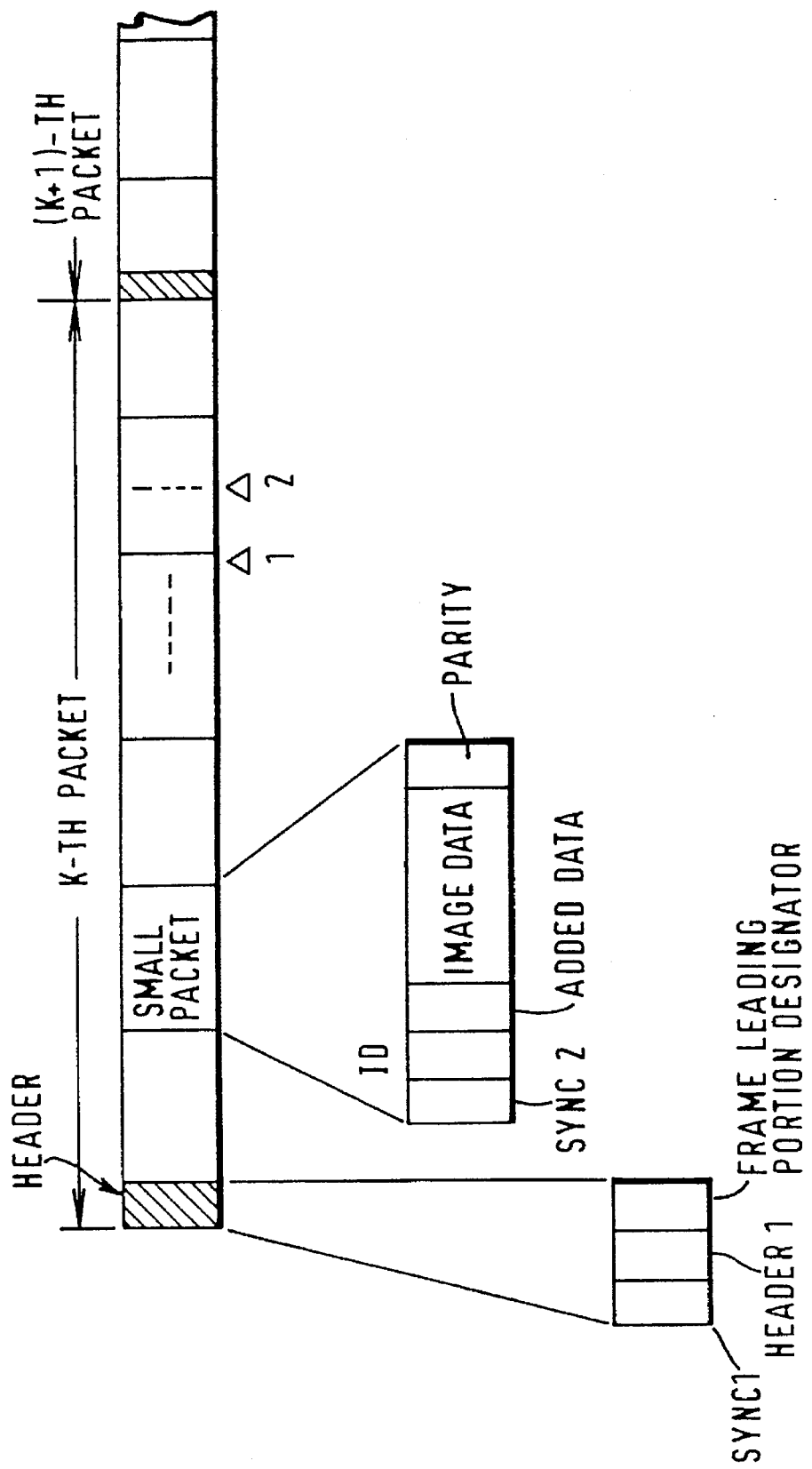
FIG. 17 is an explanatory drawing showing the editing signal.

Referring now to FIG. 17, the operation of the embodiment as described above will be explained. FIG. 17 is an explanatory drawing showing the editing signal.

Input image signals A and B are sent to the apparatus through the input terminals 101 and 102. Sync signals showing smaller units contained in the packet are extracted from input image signals A and B by synchronous extractors 155 and 156, respectively. The write controllers 7 and 8 control the writing operations of the input image signals A and B to memories 103 and 105 according to the sync signal. Now, it is assumed that packet Bn+4 of the image signal B is connected after the packet Am+3 of the image signal A. Switch 125 selects terminal a, and the readout reference signal generator 127 reads out a readout reference signal through switch 125. The readout reference signal generator also supplies to the readout controller 128, and after reading the image signal A out of memory 103, sends it to the adder 157.

At one packet before the end of the readout operation of packet Am+3, a change-over signal is given to the changeover timing generator 122. When the change-over from image signal A to image signal B is directed by this change-over signal, the change-over timing generator 122 directs the header signal preparer 151 to prepare such a header as an edit header. The header signal preparer 151 prepares headers having editing data and outputs the headers to the adder 157. Adder 157 outputs packet Am+3 of the image signal A with an edit header added to adder 131. Thus, the header (shadowed portion) is added in the leading portion of each packet as shown in FIG. 17. The header consists of, for instance, a sync signal SYNC1, a Packet Number (k), a Header 1 containing other relevant information and a frame leading portion indicator. In addition, a one bit edit header is set for Header 1. The edit header of the packet Am+3 indicates that the editing has been previously conducted.

Each packet consists of a plurality of small packets, and a header may indicate a small packet number Δ1 and a byte position Δ2 in addition to a frame leading portion indicator. The boundary between successive video frames is indicated by the small packet number Δ1 or the byte position Δ2. As shown in FIG. 17, the small packet has a sync signal SYNC2, an ID indicating a small packet number, additional data, and an error correction parity in addition to image data.

The change-over timing generator 122 forces the switch 125 to select terminal b at the time when the readout operation of the packet Am+3 ends. The packets Bn+4, Bn+5, etc. of the image signal B are read out of memory 105 successively and given to adder 135 under the control of the readout controller 129. The header signal preparer 154 prepares a header and sends it to adder 135. The adder 135 adds the header to the leading portion of the packet Bn+4 of the image signal B and outputs it to adder 131. Further, the editing header of the packet Bn+4 indicates that the editing was conducted.

When the position of a frame to be edited can be specified, an edit header may be added only to the portion corresponding to that frame.

In the edited signal decoding apparatus, an editing signal given through input terminal 141 is sent to the variable length decoder 142 through a buffer 160, as shown in FIG. 16. The header extractor 140 extracts a header of the editing signal and controls buffer 160, variable length decoder 142, reverse quantizer 143, switch 162 and data start/end area detector 161.

The data start/end area detector 161 detects portions equivalent to the unnecessary sections AO and BO, as shown in FIG. 14. That is, when the edited signal indicates that the editing was conducted by an edit header, the data start/end area detector 161 first detects the position of Δ1 or Δ2 (the boundary position of video frames), as shown in FIG. 17, according to the frame boundary indicator included in the header in the leading portion of packet Am+3. The data start/end detector 161 also obtains the period from this portion to the leading portion of the next packet Bn+4. Then, the data start/end area detector 161 catches the video frame boundary position (Δ1' or Δ2') according to the header in the leading portion of the frame data and obtains the period from the leading portion of the packet Bn+4 data to Δ1' or Δ2'. The data start/end area detector 161 defines these two periods as the invalid periods and inhibits the readout operation of data corresponding to these invalid periods by controlling the buffer 160.

Switch 162 is provided with header information through a terminal 163 and selects terminal a when the decoded output of intraframe data is given from the reverse DCT unit 147. When interframe data is decoded, an adder 164 adds a differential value from the reverse DCT unit 147 with the preceding frame data from memory 149 and outputs the decoded output.

Figure 18:
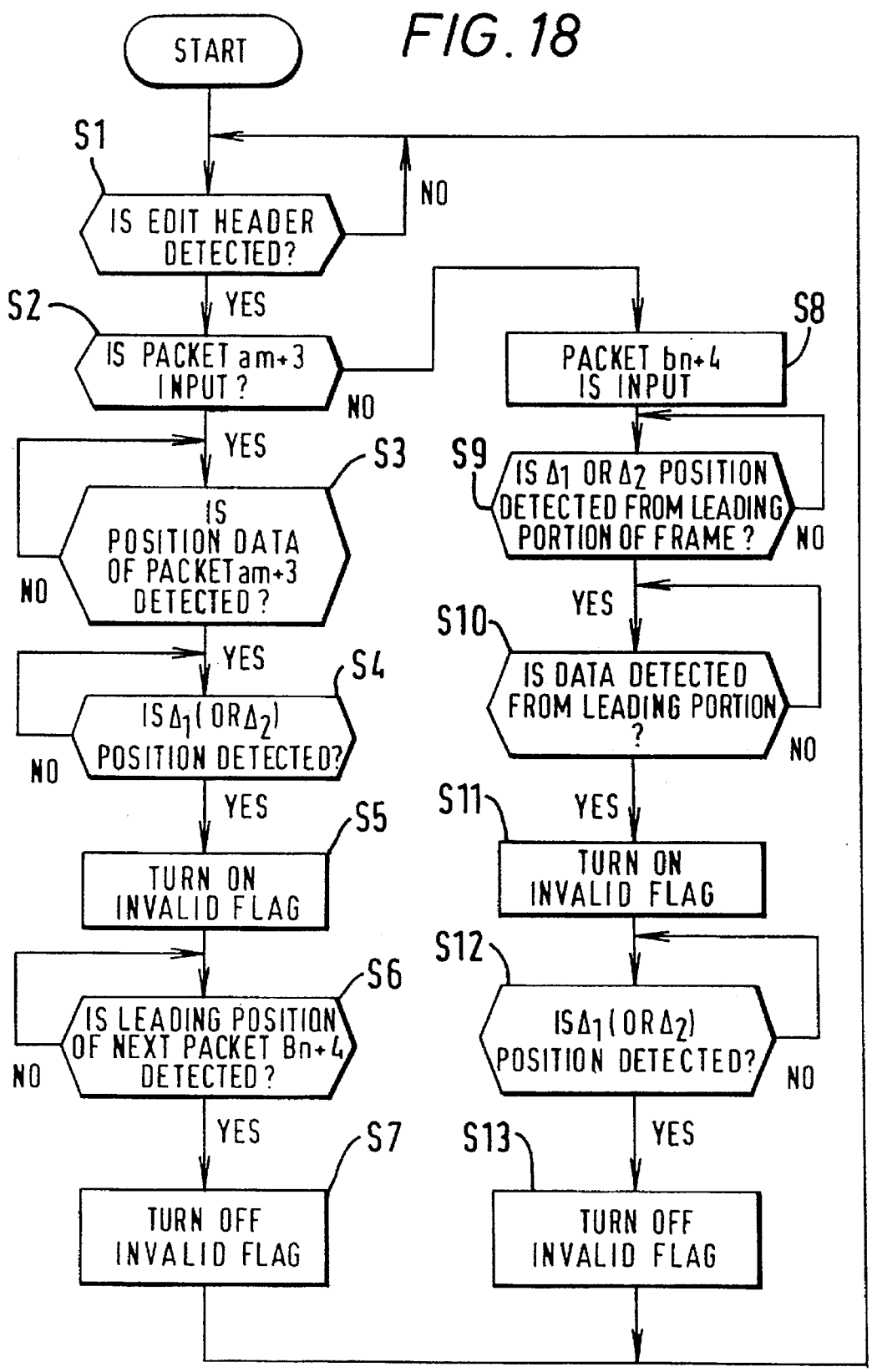
FIG. 18 is an explanatory drawing showing the flow of operation of the editing signal provided in FIG. 17.

Referring now to FIG. 18, the operation of the embodiment in this construction will be explained. FIG. 18 shows the flow of operation of this embodiment.

An editing signal with packets Am+3 and Bn+4 connected is given to input terminal 141, as shown in FIG. 4. Further, packet Am+3 of the image signal A prior to editing includes the latter half of frame am+2 and the first half of frame am+3. Similarly, packet Bn+4 of the image signal B before editing includes the latter half of frame bn+3 and the first half of frame bn+4, as shown in FIG. 4.

The editing signal is given to buffer 160 and also to header extractor 140 for extracting a header. The data start/end area detector 161 detects an edit header in step S1, as shown in FIG. 18, and judges whether an edit was conducted. The edit headers of the packets Am, Am+1, Am+2, etc. indicate that no edit was performed and the data start/end area detector 161 reads these packets out of buffer 160 and provides them to variable length decoder 142. The variable length decoder 142 decodes the packet data. Further, the output of variable length decoder 142 is sent to terminal a of switch 162 after the reverse quantizing process and reverse DCT process.

When intraframe data is represented by the header information, the output of the reverse DCT unit 147 is given to the switch 162 as a decoded output. When interframe data is represented by the header information, the output of adder 164, which adds the output of the reverse DCT unit 147 to the preceding frame data from the memory 149, is transmitted as a decoded output.

Next, when packet Am+3 is input, step S1 detects that the edit was performed by the edit header. The data start/end area detector 161 moves the process to step S3 via step S2 and detects the Δ1 or Δ2 position of the packet Am+3 (the start position of frame am+3). When the Δ1 or Δ2 position is detected in step S4, the data start/end area detector 161 turns on an invalid flag in step S5. Then, when the leading portion of the next packet Bn+4 data is detected in step S6, the data start/end area detector 161 turns off the invalid flag in step S7. That is, the data start/end area detector 161 designates the period from the Δ1 or Δ2 position to the leading portion of the next packet Bn+4 as an invalid period and inhibits the buffer 160 from outputting data corresponding to this invalid period.

Then, when packet Bn+4 is input, the data start/end area detector 161 detects that the edit was performed according to an edit header in step S1 and moves the process to step S9 through steps S2 and S8. The data start/end area detector 161 detects the initial data of the packet and turns on the invalid flag in the steps S9 through S11. Then, when the data start/end area detector 161 detects the Δ1' or Δ2' position (the end position of frame bn+3) in step S12, it turns off the invalid flag in step S13. That is, the data start/end area detector 161 designates the period from the initial data of the packet Bn+4 to the Δ1' or Δ2' position (the end position of the frame bn+3) as an invalid period and inhibits the reading of data corresponding to this period out of buffer 160. Thus, data corresponding to the unnecessary portions AO and BO is neither output from buffer 160 nor decoded.

When the data start/end area detector 161 detects the unnecessary portion, the data read from the buffer 160 skips to the next effective data portion so as not to decode unnecessary data in this embodiment. As a result, disturbance of the images at editing points is prevented.

Further, in this embodiment the effective frame of the first packet of the image signal B connected to the image signal A is not considered an interframe. When this frame is an interframe, it is better to process this frame in combination with the embodiment as shown in FIG. 7. Further, although the edit header shows that the edit performed was set at two packets before and after the editing point, it is clear that the header can be set at either one of them.

Further, this embodiment is also applicable to the editing and decoding of recorded data for a VTR. In an edit using a VTR, assuming that tracks Bn+4 through Bl+2 having the recorded image signal B are connected between tracks Am+3 and Ak+1 having the recorded image signal A, as shown in FIG. 5, it is difficult to add a header to the data in tracks Am+3 and Ak+1 or to rewrite the header. So, in this case a header is added to tracks Bn+4 and Bl+2. Even in this case, however, it is possible to set an invalid period for track Am+3 one track before track Bn+4 and for track Ak+1 one track after track Bl+2 by making the buffer capacity large to obtain the same effect as with packets.

As described above, the present invention can provide an extremely preferable coded data editing apparatus and edited coded signal decoding apparatus.

While this specification illustrates and describes what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, the present invention need not be limited to the particular embodiment disclosed as the best mode contemplated for carrying out the present invention, but that the present invention include all embodiments falling within the scope of the appended claims.

What is claimed is:

1. An edited coded data decoding apparatus for decoding an input video signal including a sequence of first and second coded video signals, at least one of the first and second coded video signals before and after the editing point is added with an edit header showing a valid data position of the first and second video signals when the first and second coded video signals are edited by the editing signal at a specified editing point, the first and second coded video signals including frames having a fixed word length, the edit header including a frame for specifying an invalid data position of the second coded video signal, comprising:

extracting means for extracting the edit header;

decoding means for decoding the first and second video signals in accordance with the extracted header and for outputting the first and second decoded video signals; and inhibiting means for inhibiting the decoding operation of the decoding means corresponding to an invalid data portion in accordance with a signal from the extracting means specifying the invalid data portion of the second coded video signal.

2. The edited coded data decoding apparatus as claimed in claim 1, wherein the inhibiting means uses an address corresponding to a frame to specify the invalid data portion.

* * * * *